United States Patent
Arora et al.

(10) Patent No.: US 7,908,649 B1
(45) Date of Patent: Mar. 15, 2011

(54) METHOD AND APPARATUS FOR PROVIDING EFFICIENT AUTHORIZATION SERVICES IN A WEB CACHE

(75) Inventors: Komal Arora, Haryana (IN); Ravi Krishna, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 1132 days.

(21) Appl. No.: 11/231,414

(22) Filed: Sep. 20, 2005

(51) Int. Cl.
*G06F 15/16* (2006.01)

(52) U.S. Cl. .......................................................... 726/7
(58) Field of Classification Search ............... 726/3, 7
See application file for complete search history.

(56) References Cited

U.S. PATENT DOCUMENTS

| | | | |
|---|---|---|---|
| 6,047,268 A * | 4/2000 | Bartoli et al. | 705/35 |
| 6,584,505 B1 * | 6/2003 | Howard et al. | 709/225 |
| 7,552,338 B1 * | 6/2009 | Swildens et al. | 713/176 |
| 2002/0169961 A1 * | 11/2002 | Giles et al. | 713/175 |

* cited by examiner

*Primary Examiner* — Kambiz Zand
*Assistant Examiner* — Simon Kanaan
(74) *Attorney, Agent, or Firm* — Perkins Coie LLP

(57) ABSTRACT

Web server and Web cache operations to permit efficient user authorization and cross-domain authentication without repeated login requirements are described. Techniques to prevent unauthorized use of protected resources are also discussed.

8 Claims, 4 Drawing Sheets

METHOD AND APPARATUS FOR PROVIDING EFFICIENT AUTHORIZATION SERVICES IN A WEB CACHE

FIELD OF THE INVENTION

The invention relates to user authentication and access authorization across multiple Web sites. More specifically, the invention relates to a distribution of authorization services among Web servers in a way that permits efficient Single-Sign-On operations.

BACKGROUND

Many organizations make information available in electronic form on websites. Such electronic distribution permits users to obtain the information whenever they need it, from wherever they happen to be. Users commonly access the resources with a software program known as a Web browser, or simply "browser." The browser acts as the client in a client-server interaction; the server's role is usually performed by a second software program known as a Web server. The browser and Web server communicate according to a protocol known as the Hypertext Transfer Protocol ("HTTP"), which is described in Internet Engineering Task Force ("IETF") Request For Comments ("RFC") number 1945. Subsequent RFCs describe extensions and modifications to the protocol.

HTTP is a "connectionless" protocol. That is, despite its use of the connection-oriented Transmission Control Protocol ("TCP"), there is no inherent mechanism to permit the server to determine whether two requests came from the same client. A client establishes a connection and transmits a request for a document or other resource, which it identifies with a string known as a "Uniform Resource Locator" or "URL." The server responds by transmitting the requested data (or an error or other indicator) to the client; after this request-response sequence, the TCP connection is closed. (Certain extensions to HTTP permit several transactions to occur over a single TCP connection for improved efficiency, but each request is essentially independent, and the protocol permits each transaction to occur separately.)

RFCs 2109 and 2965 describe HTTP State Management Mechanisms where a server can issue a parcel of data known as a "cookie" to a client. When the client makes subsequent requests to that server, it sends the cookie with the request, and the server can use the data in the cookie to correlate the present request with earlier requests by the same client. A client will only send the cookie to the server that set it (or, in some circumstances, to a server in the same domain).

HTTP also provides mechanisms for protecting certain materials on a Web server against public access. These mechanisms permit the operator of a Web site to restrict access to certain documents or other information. To obtain copies of restricted materials, a browser must present credentials that are acceptable to the server. Often, the credentials are a username and password that were entered by the browser's user. Each request to the Web server (or for a subset of the information on the server) is accompanied by the credentials. Like RFC-2109 cookies, user credentials are only transmitted to one server (the server that originally requested the credentials).

The request-correlation and state management made possible by HTTP cookies and the user authentication capabilities of the protocol are rudimentary, but adequate for many purposes. However, some organizations maintain many servers for performance, redundancy, or other reasons. These servers often operate under different domain names. In one typical network topology, client requests are directed to a hub, or "caching," server, and then forwarded to one or another "origin" servers where the requested data actually reside. In another common topology, requests from a number of clients (for example, all of the users at a university or corporation) are sent to a proxy server, which forwards the requests to the servers where the requested data reside. Both of these topologies can interfere with HTTP state management and authentication and cause undesirable effects such as repeated demands for credentials from a user whose identity has already been sufficiently proven to at least one of the servers. Methods of coordinating Web server operations to relieve these undesirable effects may be useful in many situations.

SUMMARY OF THE INVENTION

A Hypertext Transfer Protocol ("HTTP") request is received from a client and examined to determine whether it has a valid, unexpired cookie. If the request has no cookie, an invalid cookie, or an expired cookie, an HTTP response to cause the client to request a login form is transmitted to the client.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Embodiments of the invention use cookies to carry information about a client's authorization to use resources from a group of servers. Data in the cookies help prevent unauthorized users from accessing the resources.

Figure 1:
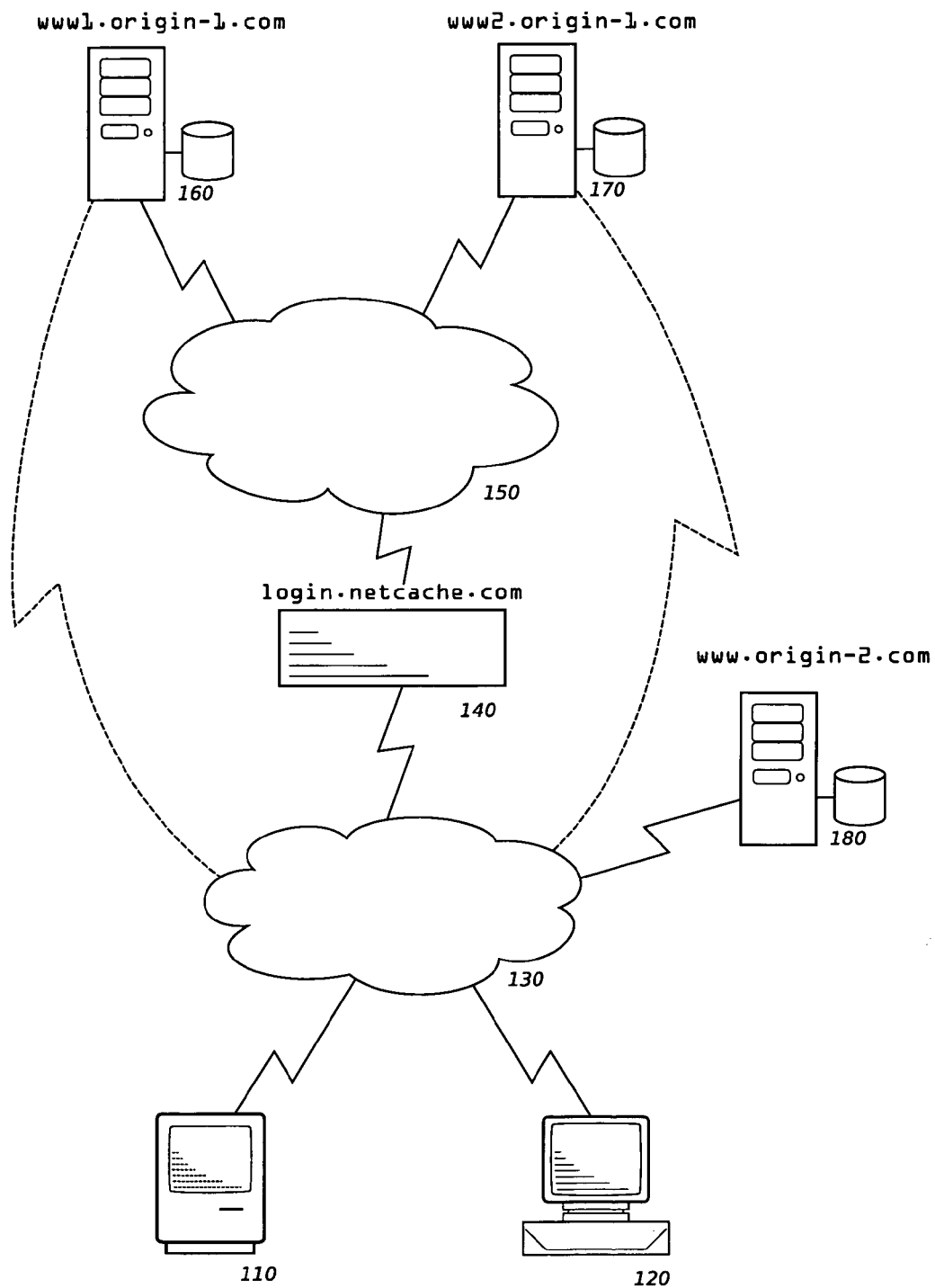
FIG. 1 is a network map of a group of computer systems that can support an embodiment of the invention.

FIG. 1 shows a network map including a Web cache and Web servers implementing portions of an embodiment of the invention. Clients 110 and 120 connect to a first network 130, which may be the Internet or other similar distributed network. Web cache 140 is also connected to network 130, and can communicate with clients 110 and 120. Web cache 140 and servers 160 and 170 are connected to a second network 150, which may also be the Internet, a privately-administered intranet, or a combination of public and private data networks. Servers 160 and 170 may also have direct connections to first network 130, so that clients 110 and 120 can communicate directly with them. Server 180 may have only a connection to first network 130, but may still participate in an embodiment of the invention as detailed below.

Servers 160, 170, and 180 may contain canonical versions of data offered to users. For this reason, the servers may be called "origin" servers. The servers' domain names, as assigned for the purposes of this example, are shown near the icons: server 160 is named www1.origin-1.com; server 170 is www2.origin-1.com; and server 180 is www.origin-2.com. Servers 160 and 170 are in the same domain ("origin-1.com"), while server 180 is in a different domain ("origin-2.com").

Figure 2:
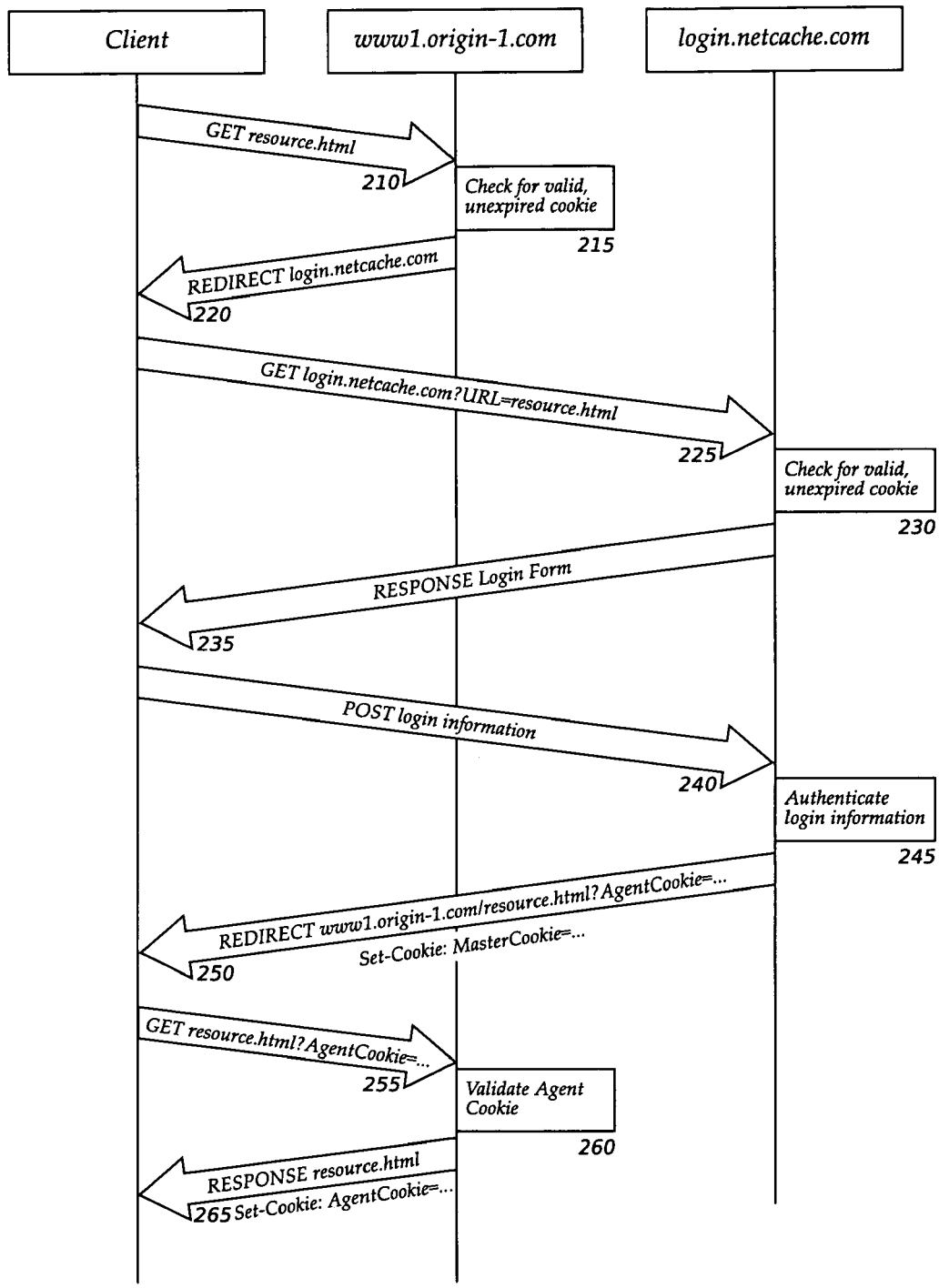
FIG. 2 shows an example interaction between a Web client, a Web server, and a Web cache according to an embodiment of the invention.

Web cache 140 may serve as the "front end" for servers 160 and 170, accepting requests from clients 110 and 120 and responding with cached data to reduce the load on servers 160 and 170, or forwarding the requests to one or the other of the servers based on a load balancing or redundancy policy. However, in addition to these caching, request-directing, and load-balancing functions, a Web cache according to an embodiment of the invention can provide authentication services as shown in FIG. 2.

A request by client 110 for a privileged resource from server 160 may proceed as follows: client 110 sends an HTTP request for the resource to server 160 (210). A software agent embodying the invention on server 160 receives the request and examines it to determine if the client sent no cookie, sent an invalid cookie, or sent an expired cookie (215). (The contents of the cookie, and the meanings of "invalid" and "expired," are discussed below.)

If there is no cookie or an invalid or expired cookie, the software agent returns an HTTP "Redirect" response (220) to cause the client to request a login form over a network connection from Web cache 140, which implements another portion of an embodiment of the invention. The Redirect response may contain information about the originally-requested URL.

Client 110 transmits a second HTTP request to Web cache 140 (225), according to the "Redirect" response it received from server 160. In some embodiments, the second HTTP request may be transmitted over a secure network connection according to the Secure Sockets Layer ("SSL") protocol, various versions of which are described in U.S. Pat. No. 5,657,390 issued to Elgamal et al. and IETF RFC 2246, among other references. A request over an SSL connection is indicated by the prefix "https" at the start of the requested URL. SSL transmission may be desirable to prevent interception of sensitive username and password information.

The second HTTP request is examined to determine whether the client has sent a cookie, and whether the cookie (if any) is invalid or expired (230). If there is no cookie, or the cookie is invalid or expired, the Web cache transmits the login form (235) specified by the first HTTP "Redirect" response (220) and requested by the client (225). The login form may contain text and Hypertext Markup Language ("HTML") FORM fields to request client's username and password.

A user at client 110 may enter his username and password (or similar authentication information) and direct the client to transmit the login information to the Web cache (240). This transmission is the client's third HTTP request in this example sequence, and its second request to the Web cache. This request may also be sent over an SSL connection.

Web cache 140 will authenticate the login information (245), for example by comparing it to locally-stored information or by interacting with a separate authentication server (not shown). If the authentication is successful, Web cache 140 will return an HTTP "Redirect" response (250) to cause the client to repeat its first HTTP request (210) to obtain the originally-requested resource from server 160. However, the repeated request will vary from the original in this particular: the repeated request will include a valid cookie, provided by the Web cache, to indicate to server 160 that the user has been authenticated.

The Web cache's "Redirect" response will also set a cookie that the client will transmit to the Web cache if it has occasion to interact with the Web cache again in the future. This cookie may be different than the cookie provided to permit the client to obtain protected resources from server 160. These two types of cookies will be referred to as "master" and "agent" cookies as follows: a "master" cookie is one containing information for the Web cache, that the client will transmit to the Web cache when it requests resources located there. An "agent" cookie is one containing information for an origin server; the client will transmit the appropriate agent cookie to an origin server when it requests a resource located on the origin server.

To complete the interaction depicted in FIG. 2, client 110 transmits an HTTP request to server 160 (255), the request containing an appropriate agent cookie provided by the Web cache as part of "Redirect" response 250. Server 160 validates the agent cookie (260) and provides the requested resource (265). Subsequent HTTP requests from client 110 to server 160 for other resources will also contain the agent cookie, and may often be honored by server 160 immediately, without the intervening requests from the client to the Web cache (i.e. 225-250). Circumstances under which the agent cookie may not be accepted will be discussed below.

Figure 3:
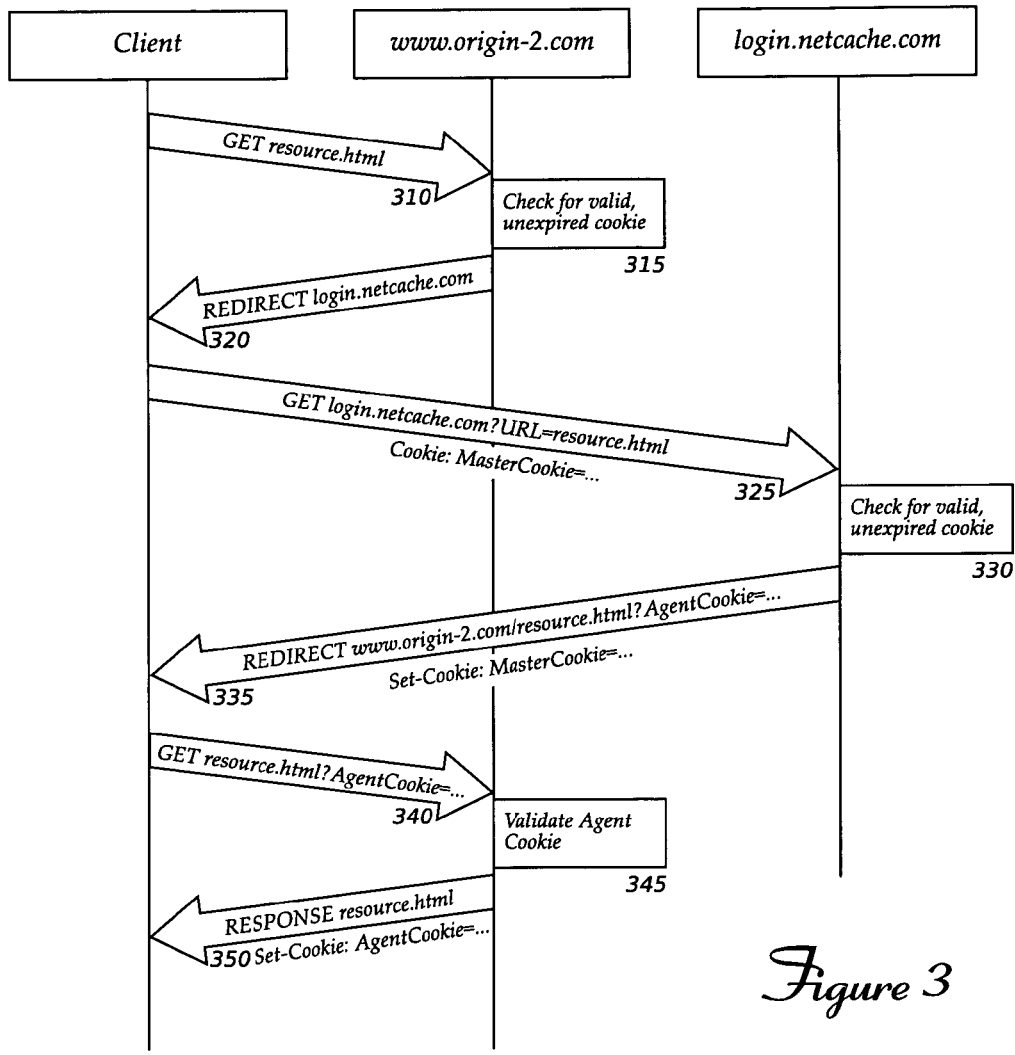
FIG. 3 shows a second example interaction between a Web client, a Web server, and the Web cache.

FIG. 3 shows a series of requests and responses between client 110, server 180, and Web cache 140. These interactions take place after the sequence described with reference to FIG. 2, so client 110 has a master cookie for Web cache 140 and an agent cookie for server 110.

First, the client requests a privileged resource from server 180 (310). Since the server's domain, www.origin-2.com, is different from the domains of both server 110 (www1.origin-1.com) and the Web cache (login.netcache.com), no cookie accompanies the request. Server 180 examines the request (315) and determines that it lacks a valid cookie, so it responds with an HTTP "Redirect" response (320) to cause the client to request a login page from Web cache 140. The response also contains the original URL that the client requested.

Client 110 requests the login page specified in the "Redirect" request from Web cache 140 by transmitting a second HTTP request (325). However, since the client previously received a master cookie from the Web cache (see FIG. 2, 250), request 325 is transmitted with the master cookie.

Web cache 140 receives request 325 from client 110, validates the master cookie received with the HTTP request (330), and transmits an HTTP "Redirect" response immediately, instead of transmitting the requested login page. The Web cache is able to omit the login page processing because the validated master cookie contains authentication and other information to permit the Web cache to determine that the client should be allowed to access the privileged resource it requested from server 180. Therefore, an embodiment of the invention may be able to prevent repetitive requests to the user to enter his username and password or other login information before being allowed to access privileged resources, even if the resources reside on origin servers in different domains. Request 325 and "Redirect" response 330 may occur over an SSL connection.

The HTTP "Redirect" response from the Web cache will cause client 110 to repeat its original request 310 to server 180, but the repeated request (340) will include an agent cookie generated by the Web cache to inform server 180 that client 110 has been authenticated and is to be allowed to access the requested resource. Finally, server 180 will validate the agent cookie(345) and return the requested data (350).

The client-server interactions described with reference to FIGS. 2 and 3 made frequent use of cookies. As mentioned earlier, cookies are parcels of data that a Web server can send to a browser, and that the browser will return to the Web server with subsequent requests. Cookie contents are opaque to the client; that is, the client need not do anything with the data except send it to the Web server. As mentioned earlier, and described in greater detail in RFCs 2109 and 2965, cookies are associated with the domain of the Web server, so a server in one domain cannot set a cookie to be sent to a server in a different domain. However, in the interactions described above, the Web cache provides agent cookies to the client for use with origin servers that may not be in the same domain as the Web cache. Since true cookies according to the RFCs ("HTTP cookies") cannot be used in this way, embodiments of the invention employ an alternate method of sending cookie-like data parcels between client and server in cross-domain situations.

When a client requests a resource from a server, it identifies the resource with a Uniform Resource Locator, or URL. URLs to identify resources accessed over the HTTP (and HTTPS) protocols are structured as follows:

http[s]://host[:port][/path][?search-part]

where host is the name of the Web server, port is an integer, path is a string to identify the resource at the Web server, and search-part is an arbitrary string. Square brackets indicate optional elements; for example, "http[s]" indicates that the first portion of a URL can be either "http" or "https". URLs are described in greater detail in RFC 1708.

Since the search-part portion of a URL permits an arbitrary string to be included in a URL, embodiments of the invention use search-part to transmit cookie-like data from a server in one domain to a server in another domain. A data parcel transmitted in this way is called a "URL cookie."

Embodiments of the invention may use URL cookies at several points in the transactions described above. For example, when client 110 requests a protected resource from server 160 (2xx), the server responds with a Redirect message, but includes the originally-requested URL as a URL cookie. This information is transmitted to the Web cache 140 with the request for the login page (e.g. 225, 325), and permits the Web cache to redirect the client to the original URL after a successful authentication.

As another example, when client 110 requests a protected resource from server 180 (310) (after having authenticated itself to Web cache 140, obtaining a true RFC-compliant master cookie from the Web cache, and transmitting the master cookie to the Web cache upon the redirect from server 180 (325)), the Web cache's redirect (335) includes an agent cookie for server 180 as a URL cookie.

Embodiments of the invention may place a number of different pieces of information in an agent or master cookie, regardless of whether the cookie is transmitted as a true HTTP cookie, or as part of the requested URL (a URL cookie). Some embodiments may also encrypt the cookie data and/or sign the data using a public-key or other digital signature algorithm. Encrypting and/or signing cookie data can help prevent tampering and misuse of cookie data, and can permit a software component of an embodiment of the invention on one server to confirm the authenticity of cookie data ostensibly prepared by another component of an embodiment of the invention located on a separate but cooperating server.

A master cookie may contain some or all of these elements: a magic number, a source Internet Protocol ("IP") address of the client to which the master cookie was issued, a timestamp, an expiration time, a generation number, and a username or other login information.

A magic number is a constant that may or may not encode information such as the absence or presence of other elements in the cookie. A magic number may be used to verify that a decryption or signature-verification operation completed successfully—if an encrypted cookie has been tampered with, then the decrypted cookie is very unlikely to contain a correct magic number.

A source IP address may be used to detect "replay" attacks, where an eavesdropper steals a copy of a legitimate user's master cookie and attempts to use it to access protected resources. If the eavesdropper's requests come from a different source IP address, the Web cache can detect the attack and refuse to provide an agent cookie that would permit the eavesdropper to access the protected resource.

A timestamp may be the time at which the cookie was created, while an expiration time may be a time at which the cookie is to expire. Either value may permit the Web cache to detect other "replay" attacks, where the eavesdropper obtains both a legitimate user's master cookie and access to the user's IP address. The timestamp or expiration time can place a temporal limit on the eavesdropper's ability to access protected resources with a stolen master cookie.

A generation number may be a monotonically increasing integer that provides yet more resistance to "replay" attacks: the Web cache may set a new master cookie with an incremented generation number each time the client uses the master cookie to obtain an agent cookie to access a protected resource on an origin server. If a client presents a master cookie with a generation number that is not equal to the expected generation number, the Web cache may suspect some sort of tampering or foul play and require that the user authenticate himself again.

A master cookie may contain the user's username, password, and/or other login information. This information is safe if the master cookie is encrypted with a secure algorithm. The username, password, or other information may be convenient or necessary for some interactions undertaken by the Web cache on behalf of the client.

A master cookie may also contain other information to permit the Web cache to provide additional services to the client.

Validating a master cookie may consist of some or all of the following operations: decrypting the cookie; validating a signature of the cookie; checking a magic number of the cookie; comparing a source IP address contained in the cookie with a source IP address of the client from which the cookie was received; ensuring that the time stamp indicates a time that is less than a predetermined length of time before the current time; and ensuring that the generation number is equal to the current (expected) generation.

Agent cookies are prepared by the Web cache and transmitted as URL cookies to a client that has successfully authenticated itself to the cache. An agent cookie may contain similar data to a master cookie, but may be encrypted so that only the origin server to which it applies is able to decrypt it. Agent cookies may also be signed by the Web cache with a public-key or other digital signature algorithm so that an origin server can verify that the agent cookie came from Web cache.

An agent cookie may contain an extra field that contains a generation number specific to the agent. Each time the agent receives an agent cookie, it verifies that the agent-specific generation number of the cookie is equal to the current (expected) generation number. If the generation number is verified, the agent sets a new agent cookie containing a new, incremented agent-specific generation number.

Validation of agent and master cookie generation numbers may accept generation numbers that are a up to a small, predetermined number of generations before the current expected generation number. Such "old" generations may be encountered when a client issues several requests simultaneously. For example, if a client attempted to obtain two image files to display in connection with an HTML document, the HTTP requests of those image files might include the same agent cookie (and therefore the same agent-specific generation number). The origin server might transmit the response to the first request, including an updated agent cookie with an incremented generation number, before processing the second request. When the origin server processes the second request, it will find that the agent cookie contains an earlier agent generation number. However, the validation may accept the generation if it is less than a configurable number of generations before the expected generation. Generation numbers greater than an expected generation are probably indicative of an illicit access attempt.

An agent cookie may have a timestamp or expiration time that specifies a different period of cookie validity than the lifetime of a master cookie. For example, while a master cookie might be valid for eight (8) hours, an agent cookie might only be valid for five (5) seconds. Thus, when a client requests a protected resource, it might obtain an agent cookie from the Web cache and use that cookie to request the protected resource and several associated resources (for example, a page of HTML text and images to be displayed on the page), where all the requests are made within a few seconds. If the client requested another protected resource after the agent cookie expired, it would again be redirected to the Web cache to obtain a new agent cookie. The short lifetime of an agent cookie provides frequent opportunities for the Web cache to interact with the client and to detect tampering and malicious access attempts, but does not require that the Web cache participate in every single client request, which might unacceptably degrade performance.

Figure 4:
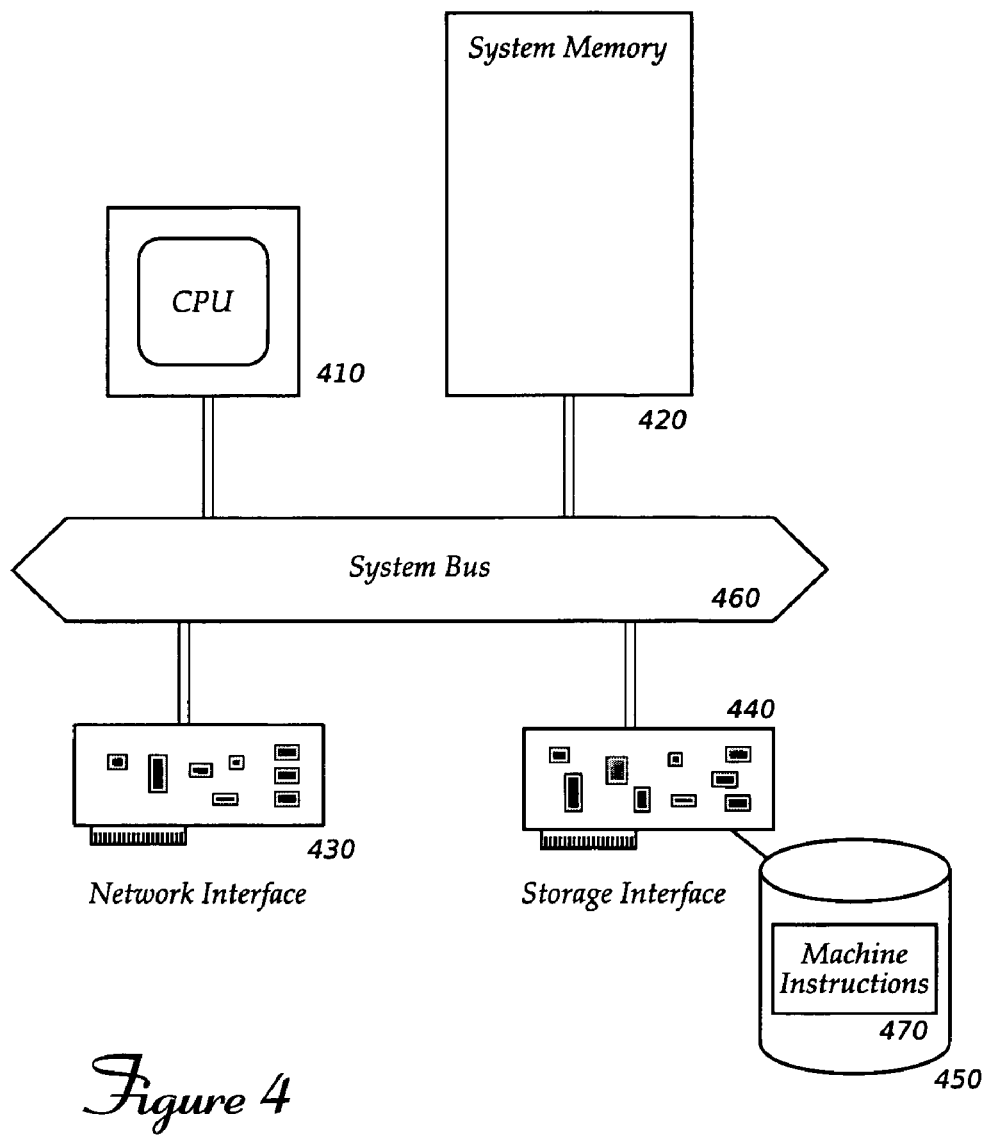
FIG. 4 is a block diagram of a hardware system that implements an embodiment of the invention.

In the foregoing figures and discussion, portions of embodiments of the invention have been described as residing on physically separate computer servers. However, it should be apparent to those of ordinary skill in the relevant arts that Web server and Web cache functionality can coexist on a single server, or even within a single program. A server that can host all or a part of an embodiment of the invention might resemble the system shown in FIG. 4. There, processor 410 communicates with system memory 420 and peripheral devices such as network interface 430 and storage interface 440 (through which data residing on hard disk 450 can be accessed). The processor, memory, and devices communicate via system bus 460. Hard disk 450 may contain machine instructions 470 to cause the system to perform operations as described above. In addition to user authentication and host cookie and agent cookie generation and validation, the system might perform a proxy HTTP request, obtaining a resource requested by the client from an origin server and returning the resource to the client, but also caching the data locally so that further requests for the same data can be serviced without disturbing the origin server.

Other embodiments of the invention may take the form of executable instructions such as machine op-codes or interpretable byte-codes such as Java byte-codes, in a form suitable for loading into a Web server to supplement the Web server's functionality. Such loadable instructions may permit the augmented Web server to perform operations including receiving a HTTP request from a client; examining the request to determine whether it includes a cookie, and validating the cookie if one is present; transmitting an HTTP "Redirect" response if the request includes no cookie or an invalid cookie; and transmitting an HTTP response containing the requested resource if the request included a valid cookie. Responses containing the requested resource may also include HTTP header fields to cause the client to set an updated agent cookie.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), Erasable Programmable Read-Only Memory (EPROM), and a transmission over the Internet.

The applications of the present invention have been described largely by reference to specific examples and in terms of particular allocations of functionality to certain hardware and/or software components. However, those of skill in the art will recognize that efficient user authorization in a Web cache can also be produced by software and hardware that distribute the functions of embodiments of this invention differently than herein described. Such variations and implementations are understood to be apprehended according to the following claims.

We claim:

1. A method comprising:
   receiving, at a web cache which caches content from a plurality of origin servers, a first request from a client, wherein the first request results from initial content request from the client to a first origin server;
   determining at the web cache whether the first request contains a valid, unexpired master data parcel containing information related to authentication; and
   in response to a determination that the first request does not contain a valid, unexpired master data parcel containing information related to authentication,
      sending an authentication login request from the web cache to the client,
      receiving from the client a response to the authentication login request at the web cache,
      using information in the response to the authentication login request to perform an authentication operation at the web cache,
      sending a first response from the web cache to the client, to cause the client to send a second content request to the first origin server, the first response causing the master data parcel to be set at the client for subsequent use by the web cache, the first response including an agent data parcel containing information related to authentication, the first response causing the client to include the agent data parcel in the second content request, for use by the first origin server, wherein at least one of the master data parcel or the agent data parcel is included in a URL;
   receiving at the web cache a second request from the client, wherein the second request from the client results from an initial content request from the client to a second origin server;
   determining at the web cache whether the second request from the client contains a valid, unexpired master data parcel containing information related to authentication; and in response to a determination that the second request contains a valid, unexpired master data parcel containing information related to authentication, sending a second response from the web cache to the client, to cause the client to send a second content request from the client to the second origin server, the second response from the web cache causing the client to include the agent data parcel in the second content request from the client to the second origin server.

2. A method as recited in claim 1, wherein the agent data parcel is set to expire at a time that is earlier than a time at which the master data parcel is set to expire.

3. A method as recited in claim 1, wherein the agent data parcel is encrypted by the web cache so that only a corresponding origin server can decrypt the agent data parcel.

4. A method as recited in claim 1, wherein the master data parcel includes a plurality of the following information items:
   a username;
   a source address;
   an expiration time;
   a time stamp;
   a generation number; and
   a reference number.

5. A network caching device comprising:
   a network interface;
   a memory; and
   control circuitry coupled to the memory and the network interface and configured to execute operations including:
      locally caching content which originates from a plurality of origins servers;
      receiving a first request from a client, wherein the first request results from initial content request from the client to a first origin server;
      determining whether the first request contains a valid, unexpired master data parcel containing information related to authentication; and
      in response to a determination that the first request does not contain a valid, unexpired master data parcel containing information related to authentication,
         sending an authentication login request to the client,
         receiving from the client a response to the authentication login request,
         using information in the response to the authentication login request to perform an authentication operation,
         sending a first response to the client, to cause the client to send a second content request to the first origin server, the first response causing the master data parcel to be set at the client for subsequent use by the network caching device, the first response including an agent data parcel containing information related to authentication, the first response causing the client to include the agent data parcel in the second content request, for use by the first origin server, wherein at least one of the master data parcel or the agent data parcel is included in a URL;
      receiving a second request from the client, wherein the second request from the client results from an initial content request from the client to a second origin server;
      determining whether the second request from the client contains a valid, unexpired master data parcel containing information related to authentication; and
      in response to a determination that the second request contains a valid, unexpired master data parcel containing information related to authentication, sending a second response to the client, to cause the client to send a second content request from the client to the second origin server, the second response causing the client to include the agent data parcel in the second content request from the client to the second origin server.

6. A network caching device as recited in claim 5, wherein the master data parcel includes a plurality of the following information items:
   a username;
   a source address;
   an expiration time;
   a time stamp;
   a generation number; and
   a reference number.

7. A network caching device as recited in claim 5, wherein the agent data parcel is set to expire at a time that is earlier than a time at which the master data parcel is set to expire.

8. A network caching device as recited in claim 5, wherein the agent data parcel is encrypted by the network caching device so that only a corresponding origin server can decrypt the agent data parcel.

* * * * *